(12) United States Patent
Chun et al.

(10) Patent No.: US 11,066,516 B2
(45) Date of Patent: *Jul. 20, 2021

(54) POLYCARBONATE RESIN COMPOSITION AND OPTICAL MOLDED ARTICLE USING THE SAME

(71) Applicant: LG CHEM, LTD., Seoul (KR)

(72) Inventors: Byoungkue Chun, Daejeon (KR); Moo Ho Hong, Daejeon (KR); Hyong Min Bahn, Daejeon (KR); Un Ko, Daejeon (KR)

(73) Assignee: LG Chem, Ltd., Seoul (KR)

( * ) Notice: Subject to any disclaimer, the term of this patent is extended or adjusted under 35 U.S.C. 154(b) by 57 days.

This patent is subject to a terminal disclaimer.

(21) Appl. No.: 16/439,099

(22) Filed: Jun. 12, 2019

(65) Prior Publication Data

US 2019/0300648 A1   Oct. 3, 2019

Related U.S. Application Data

(63) Continuation of application No. 15/556,231, filed as application No. PCT/KR2017/000374 on Jan. 11, 2017, now Pat. No. 10,385,163.

(30) Foreign Application Priority Data

Feb. 18, 2016 (KR) .................. 10-2016-0019088
Jul. 12, 2016 (KR) .................. 10-2016-0088247

(51) Int. Cl.
| | | |
|---|---|---|
| *C08G 64/06* | (2006.01) |
| *C08G 81/02* | (2006.01) |
| *C08L 69/00* | (2006.01) |
| *C08L 71/02* | (2006.01) |
| *C08L 63/00* | (2006.01) |
| *C08K 3/00* | (2018.01) |
| *C08K 5/00* | (2006.01) |
| *C08L 33/06* | (2006.01) |
| *C08L 25/06* | (2006.01) |
| *C08L 33/08* | (2006.01) |
| *C08L 33/10* | (2006.01) |

(52) U.S. Cl.
CPC .......... *C08G 64/06* (2013.01); *C08G 81/024* (2013.01); *C08K 3/00* (2013.01); *C08K 5/00* (2013.01); *C08L 33/06* (2013.01); *C08L 69/00* (2013.01); *C08L 71/02* (2013.01); *C08L 25/06* (2013.01); *C08L 33/08* (2013.01); *C08L 33/10* (2013.01); *C08L 63/00* (2013.01); *C08L 2205/03* (2013.01)

(58) Field of Classification Search
CPC .... C08L 69/00; C08L 33/068; C08L 2205/03; C08G 81/025
See application file for complete search history.

(56) References Cited

U.S. PATENT DOCUMENTS

| | | | |
|---|---|---|---|
| 6,894,112 B1 * | 5/2005 | Weber | C08L 67/02 |
| | | | 525/65 |
| 10,385,163 B2 * | 8/2019 | Chun | C08K 5/00 |
| 2007/0173618 A1 | 7/2007 | Shaikh | C08L 67/02 |
| | | | 525/466 |
| 2007/0213452 A1 | 9/2007 | Kawato | |
| 2009/0185363 A1 | 7/2009 | Ishikawa | |
| 2009/0186208 A1 | 7/2009 | Ishikawa et al. | |
| 2014/0364546 A1 | 12/2014 | Okamoto et al. | |
| 2015/0080515 A1 | 3/2015 | Daga et al. | |
| 2016/0280909 A1 | 9/2016 | Takimoto et al. | |

FOREIGN PATENT DOCUMENTS

| | | |
|---|---|---|
| CN | 101432361 A | 5/2009 |
| CN | 101437896 A | 5/2009 |
| JP | 6-345934 A | 12/1994 |
| JP | 11-158364 A | 6/1999 |
| JP | 2001-208917 A | 8/2001 |
| JP | 4069364 B2 | 4/2008 |
| JP | 5277833 B2 | 8/2013 |
| JP | 2013-231899 A | 11/2013 |
| JP | 5708979 B2 | 4/2015 |
| JP | 2015-93912 A | 5/2015 |
| JP | 2015-180709 A | 10/2015 |
| JP | 5879124 B2 | 3/2016 |
| KR | 10-2007-0058085 A | 6/2007 |
| KR | 10-2008-0111516 A | 12/2008 |
| KR | 10-1153090 B1 | 6/2012 |
| KR | 10-2014-0010722 A | 1/2014 |
| KR | 10-1393822 B1 | 5/2014 |
| KR | 10-2014-0115305 A | 9/2014 |
| KR | 10-1499245 B1 | 3/2015 |

* cited by examiner

*Primary Examiner* — Jeffrey C Mullis
(74) *Attorney, Agent, or Firm* — Dentons US LLP

(57) ABSTRACT

The present invention relates to a polycarbonate resin composition for a light guide plate and an optical molded article using the same. The polycarbonate resin composition according to the present invention is excellent in transmittance and color tone uniformity required as the light guide plate, and also is excellent in processability and thus can be usefully used as a material of the light guide plate.

16 Claims, No Drawings

POLYCARBONATE RESIN COMPOSITION AND OPTICAL MOLDED ARTICLE USING THE SAME

CROSS-REFERENCE TO RELATED APPLICATION(S)

This application is a Continuation of U.S. patent application Ser. No. 15/556,231, filed Sep. 6, 2017, which is a National Stage Application of International Application No. PCT/KR2017/000374, filed Jan. 11, 2017, which claims the benefit of Korean Patent Application No. 10-2016-0019088, filed Feb. 18, 2016, and Korean Patent Application No. 10-2016-0088247, filed Jul. 12, 2016, all of which are hereby incorporated by reference in their entirety for all purposes as if fully set forth herein.

TECHNICAL FIELD

The present invention relates to a polycarbonate resin composition for a light guide plate having excellent transmittance, excellent color tone uniformity and excellent processability, and an optical molded article using the same.

BACKGROUND OF ART

Recently, as liquid crystal display devices have become thinner and larger, the thickness of parts used for them is becoming thinner and thinner. A liquid crystal display ("LCD") is equipped with a backlight, which is a light emitting part that emits light from the back of LCD, and a light guide plate or a diffusion plate for diffusing or transmitting light is used depending on the type and position of light source. The thickness of the light guide plate also becomes thinner and thinner in accordance with the recent trend, and the general level of the light guide plate actually used is around 0.5 mm in thickness, but the thinnest is up to about 0.3 mm, and the thickness tends to become thinner in future.

In accordance with the thinning trends, the use of edge type backlight unit in which LEDs are mounted to the corner of the backlight is increasing, instead of cold cathode fluorescent lamps (CCFLs) which have been mainly used in the past. In the edge type backlight unit, light emitted from a light source mounted to the corner is transmitted through the light guide plate, and part of the light transmitted through the plate is scattered by a light scattering layer applied to the surface of the plate, whereby the liquid crystal display device is illuminated by the surface light source that uniformly emits light on the entire surface. The light scattering layer is formed by transferring or printing a dot pattern on the surface of the light guide plate. Recently, a fine prism structure is also transferred to increase the light efficiency.

Since the light guide plate requires high light transmittance, PMMA, which is an acrylic resin, is generally used as a material of the light guide plate. Although acrylic resins have high light transmittance, they are insufficient in mechanical strength and thus are not suitable for application to a thin light guide plate, and also they have insufficient heat resistance and thus are vulnerable to heat generated in electronic equipment which are disadvantageous.

Polycarbonate has attracted attention instead of such an acrylic resin. Polycarbonate is superior in mechanical strength as compared with acrylic resin and thus can be used as a material for a thin light guide plate. In addition, since polycarbonate is excellent in heat resistance and flame retardancy, it is gradually replacing the acrylic resin in LED backlight unit and lighting apparatus with a large amount of heat generation. However, since polycarbonate has a lower total light transmittance than an acrylic resin, it is required that polycarbonate has a light transmittance corresponding to that of an acrylic resin while maintaining the advantages of polycarbonate.

In this connection, Japanese Patent Laid-Open Publication No. 2008-045131 discloses that PMMA having a viscosity average molecular weight (My) of 20,000 to 60,000 among an acrylic resin is blended in a range of 0.1 to 0.3 phr with a polycarbonate having an Mv of 15,000 to 40.000 to exhibit excellent photoconductivity. However, it is still necessary to improve physical properties such as heat resistance.

Given the above circumstances, the present inventors have conducted intensive studies about a material which can be used as a material for the light guide plate, and found that a polycarbonate resin composition comprising a block copolymer containing polyethylene oxide block and polypropylene oxide block and a vinyl-based polymer including a (meth)acrylate repeating unit containing an epoxy functional group at the same time, as described below, is excellent in light transmittance, color tone stability and the like, and thus can be used as a material for a light guide plate, thereby completing the present invention.

DETAILED DESCRIPTION OF THE INVENTION

Technical Problem

It is an object of the present invention to provide a polycarbonate resin composition for a light guide plate having excellent transmittance, excellent color tone uniformity and excellent processability.

It is another object of the present invention to provide an optical molded article using the above-mentioned resin composition.

Technical Solution

In order to achieve these objects, the present invention provides a polycarbonate resin composition comprising: 100 parts by weight of a polycarbonate; 0.02 to 1 part by vweight of a block copolymer containing a polyethylene oxide (PEO) block represented by the following chemical formula 1 and a polypropylene oxide (PPO) block represented by the following chemical formula 2; and 0.01 to 5 parts by weight of a vinyl-based polymer including a (meth) acrylate repeating unit containing an epoxy fiunctional group.

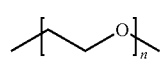

[Chemical Formula 1]

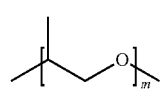

[Chemical Formula 2]

in the above formulas 1 and 2, n and m are each independently an integer of 1 or more, and n+m is 7 to 70.

In addition, the present invention provides a polycarbonate resin composition comprising: 100 parts by weight of a polycarbonate; 0.02 to 1 part by weight of a block copolymer containing a polyethylene oxide (PEO) block represented by the formula 1 and a polypropylene oxide (PPO) block represented by the formula 2; and 0.01 to 5 parts by weight of a transmittance improving agent having an epoxy functional group, wherein a transmittance of long-wavelength light measured for a test specimen having a thickness of 4 mm is 80% or more Polycarbonate The term "polycarbonate" as used herein means a polymer produced reacting a diphenolic compound, a phosgene, a carbonic acid ester, or a combination thereof. Polycarbonate is extremely excellent in heat resistance, impact resistance, mechanical strength, transparency and the like, and thus is widely used in the production of compact discs, transparent sheets, packaging materials, automobile bumpers, ultraviolet blocking films and the like. In particular, in the present invention, polycarbonate is used as a material of the light guide layer.

Examples of the diphenolic compound include hydroquinone, resorcinol, 4,4'-dihydroxydiphenyl, 2,2-bis(4-hydroxyphenyl) propane (also referred to as 'bisphenol A'), 2,4-bis(4-hydroxyphenyl)-2-methylbutane, bis(4-hydroxyphenyl)methane, 1,1-bis(4-hydroxyphenyl)cyclohexane 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl) propane, 2,2-bis(3,5-dibromo-4-hydroxyphenyl)propane bis(4-hydroxyphenyl)sulfoxide, bis(4-hydroxyphenyl)ketone, bis(4-hydroxyphenyl)ether and the like. Preferably, 4,4'-dihydroxydiphenyl and 2,2-bis(4-hydroxyphenyl)propane can be used. In this case, the structure of the polycarbonate is represented by the following chemical formula 3:

[Chemical Formula 3]

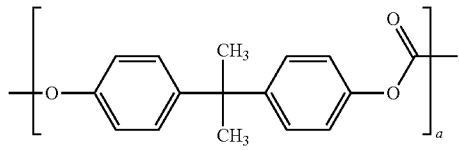

in the above formula 3, a is an integer of 1 or more.

The polycarbonate may be a mixture of copolymers prepared from two or more diphenols. In addition, as the polycarbonate, a linear polycarbonate, a branched polycarbonate, a polyester carbonate copolymer resin and the like can be used.

Examples of the linear polycarbonate may include polycarbonates prepared from bisphenol-A. The branched polycarbonates may be those prepared by reacting a polyfunctional aromatic compound such as trimellitic anhydride and trimellitic acid with a diphenol and a carbonate. The polyfunctional aromatic compound may be contained in an amount of 0.05 to 2 mol % based on the total amount of the branched polycarbonate. Examples of the polyester carbonate copolymer resin may include those prepared by reacting a bifunctional carboxylic acid with a diphenol and a carbonate. As the carbonate, diaryl carbonate such as diphenyl carbonate, ethylene carbonate and the like may be used.

Preferably, the polycarbonate has a weight average molecular weight of 14,000 to 50,000 g/mol. Within the above range, the moldability and workability are excellent during the production of thin film products.

Polyethylene Oxide-Polypropylene Oxide Block Copolymer

On the other hand, the polycarbonate is relatively excellent in mechanical properties, electrical properties, and weather resistance as compared with other kinds of resins, and thus can be used as a light guide plate by itself. However, since the light transmittance, which should be considered important in the light guide plate, is slightly low, it is necessary to improve the transmittance. Therefore, in the present invention, a polyethylene oxide-polypropylene oxide block copolymer is used together with the polycarbonate.

The term "polyethylene oxide-polypropylene oxide block copolymer" as used herein refers to a block copolymer including at least one polyethylene oxide (PEO) block represented by the above formula 1 and at least one polypropylene oxide (PPO) block represented by the above formula 2, respectively, wherein n in the formula 1 means the total number of ethylene oxide repeating units in the block copolymer, and m in the formula 2 means the total number of propylene oxide repeating units in the block copolymer. Here, the block copolymer refers to a copolymer in which two or more homopolymer blocks are linked by a covalent bond, and it can be in the form of a binary block copolymer having two distinct types of blocks, and a ternary block copolymer having three distinct types of blocks. In this case, the polyethylene oxide-polypropylene oxide block copolymer may be prepared by polymerizing polyoxyethylene glycol and polyoxypropylene glycol.

Conventionally, attempts have been made to improve the light transmittance of the light guide plate by adding polyoxyalkylene glycol. However, in the case of polyoxypropylene glycol, compatibility with polycarbonate is high, but the heat resistance is low. Thus, there arises a problem that the light transmittance is rather lowered due to a high temperature at the time of producing the light guide plate. In addition, in the case of polyoxyethylene glycol, there is a problem of migration since it has a linear structure having no substituent in the side chain.

However, the block copolymer containing both the polyethylene oxide block and the polypropylene oxide block as in the present invention complements the disadvantages of the respective polyoxyalkylene glycols with each other, so that both the color tone stability and the light transmittance can be improved.

According to one embodiment of the present invention, it could be confirmed that examples using the polyethylene oxide-polypropylene oxide block copolymer exhibited remarkably improved color tone stability and light transmittance as compared with comparative examples using each of polyoxyethylene glycol and polyoxypropylene glycol.

The above polyethylene oxide-polypropylene oxide block copolymer may be a binary block copolymer or a ternary block copolymer. For example, the above polyethylene oxide-polypropylene oxide block copolymer may be a binary block copolymer in the form of PEO-PPO. Alternatively, the polyethylene oxide-polypropylene oxide block copolymer may be a ternary block copolymer in the form of PEO-PPO-PEO or PPO-PEO-PPO. Of these, in the case of using a ternary block copolymer, PEO and PPO blocks having different refractive indexes can be combined in the form of PEO-PPO-PEO or PPO-PEO-PPO to show the effect of improving the transmittance as compared with the case of using a binary block copolymer in the form of PEO-PPO. In this case, the PEO-PPO-PEO ternary block copolymer may be represented by the following chemical formula 4, and the PPO-PEO-PPO ternary block copolymer may be represented by the following chemical formula 5.

[Chemical Formula 4]

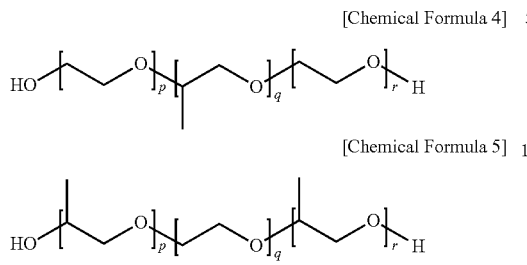

[Chemical Formula 5]

in the above formulas 4 and 5, p, q and r are each independently an integer of 1 or more, and p+q+r is 7 to 70.

The above polyethylene oxide-polypropylene oxide block copolymer preferably has a weight average molecular weight of 500 to 10,000 g/mol, for example, 1,000 to 10,000 g/mol. Within the above range, the physical properties of the light guide plate can be effectively improved.

In addition, the polyethylene oxide-polypropylene oxide block copolymer may be contained in an amount of 0.02 to 1 part by weight based on 100 parts by weight of the polycarbonate. For example, the polyethylene oxide-polypropylene oxide block copolymer may be contained in an amount of 0.05 to 1 part by weight, particularly 0.05 to 0.7 part by weight, or more particularly 0.05 to 0.5 part by weight, based on 100 parts by weight of the polycarbonate. Within the above range, the light transmittance and the color tone stability can be improved without deteriorating the properties of the polycarbonate in the resin composition.

Epoxy Group-Containing Vinyl-Based Polymer

On the other hand, the polycarbonate is relatively excellent in mechanical properties, electrical properties, and weather resistance as compared with other types of resins, and thus can be used as a light guide plate by itself. However, since the color tone stability under high temperature and high humidity conditions which should be considered important in the light guide plate is low, it is necessary to improve the color tone stability. Thus, by using an epoxy group-containing vinyl-based polymer together with the polycarbonate, the hydrolysis of the polymer under high temperature and high humidity conditions can be suppressed.

The term "epoxy group-containing vinyl polymer" as used herein means a vinyl-based polymer including a (meth)acrylate repeating unit containing an epoxy functional group as a polyfunctional epoxy compound. Here, the term "(meth)acryl" means acryl and methacryl. That is, (meth)acrylate should be understood as meaning acrylate or methacrylate.

According to one embodiment of the present invention, it could be confirmed that in the case of the examples using a vinyl-based polymer including a (meth)acrylate repeating unit containing an epoxy functional group, the color tone stability was maintained even after being left for a long time under high temperature and high humidity conditions, as compared with the comparative examples not using a vinyl-based polymer including a (meth)acrylate repeating unit containing an epoxy functional group.

Further, according to another embodiment of the present invention, it could be confirmed that, in the case of examples using the vinyl-based polymer including a (meth)acrylate repeating unit containing an epoxy functional group, both the color tone stability and the light transmittance are remarkably improved as compared with comparative examples using an alicyclic compound containing an epoxy functional group.

The vinyl-based polymer including the (meth)acrylate repeating unit containing the epoxy functional group may be contained in an amount of 0.01 to 5 parts by weight based on 100 parts by weight of the polycarbonate. For example, the vinyl-based polymer including a (meth)acrylate repeating unit containing an epoxy functional group may be used in an amount of 0.01 to 2.5 parts by weight, particularly 0.01 to 1 part by weight, more particularly 0.01 to 0.1 part by weight, still more particularly 0.05 to 0.1 part by weight based on 100 parts by weight of the polycarbonate. When the amount is less than 0.01 part by weight, the degree of maintaining the color tone stability for a long time under high temperature and high humidity conditions is low. When the amount exceeds 5 parts by weight, the properties of polycarbonate can be deteriorated.

Further, the vinyl-based polymer including a (meth)acrylate repeating unit containing an epoxy functional group preferably has a weight average molecular weight of 1.000 to 10.000 g/mol. Within the above range, the physical properties of the light guide plate can be effectively improved.

Specifically, the epoxy group-containing vinyl-based polymer may include a (meth)acrylate repeating unit containing an epoxy functional group. In the (meth)acrylate repeating unit containing an epoxy functional group, the epoxy functional group can be bonded to the end of the branched chain of the (meth)acrylate repeating unit. The above (meth)acrylate repeating unit may contain a main chain formed through polymerization between vinyl-based functional groups, and a branched chain extending in a branch shape from the main chain. The epoxy functional group may form a bond at the end of the branched chain of the (meth)acrylate repeating unit.

More specifically, the (meth)acrylate repeating unit containing the epoxy functional group may include a repeating unit represented by the following chemical formula 11:

[Chemical Formula 11]

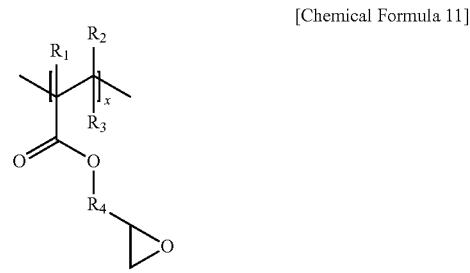

in the above formula 11, $R_1$ to $R_3$ are each independently hydrogen or $C_{1-10}$alkyl, $R_4$ is $C_{1-10}$alkylene, and x is an integer of 1 to 20.

The alkyl or alkylene may be substituted or unsubstituted, and the term "substituted" means that a hydrogen atom contained in an alkyl group or an alkylene group is replaced with a specific functional group. Examples of the substituted functional groups are not particularly limited, and various functional groups or atomic groups widely known in the art, such as halogen, hydroxy group, amino group and the like can be used without limitation.

Further, the epoxy group-containing vinyl-based polymer may have an epoxy equivalent weight of 100 to 500 g/mol, or 200 to 400 g/mol. As the epoxy group-containing vinyl-based polymer contains a specific amount of epoxy functional groups as described above, excellent color tone stability can be maintained even after being left for a long time under high temperature and high humidity conditions.

The epoxy group-containing vinyl-based polymer may further include an aromatic vinyl-based repeating unit or a (meth)acrylic-based repeating unit. The aromatic vinyl-based repeating unit means a repeating unit derived from an aromatic vinyl-based monomer, and specifically means a repeating unit constituting a polymer formed through polymerization between aromatic vinyl-based monomers. That is, the epoxy group-containing vinyl polymer may include, for example, a copolymer containing at least one repeating unit selected from the group consisting of a (meth)acrylate repeating unit containing an epoxy functional group; an aromatic vinyl-based repeating unit; and a (meth)acrylic-based repeating unit.

The aromatic vinyl monomer is a compound having one vinylic double bond and at least one benzene nucleus in the same molecule, and specific examples of the aromatic vinyl monomer are not particularly limited, but for example, compounds such as styrene, alpha-methylstyrene, 2-methylstyrene, 3-methylstyrene, 4-methylstyrene, 4-ethylstyrene, t-butylstyrene, 2,5-dimethylstyrene, 1,3-dimethylstyrene, 2,4-dimethylstyrene, 4-methoxystyrene, 4-ethoxystyrene, 4-propoxystyrene, 4-butoxystyrene, chlorostyrene, dichlorostyrene, trichlorostyrene, vinyltoluene, bromostyrene, dibromostyrene, tribromostyrene, vinyl naphthalene, isopropenyl naphthalene, isopropenyl biphenyl, divinyl benzene, alpha-methyl styrene vinyl toluene and the like can be mentioned.

More specifically, it may include the aromatic vinyl-based repeating unit represented by the following chemical formula 12:

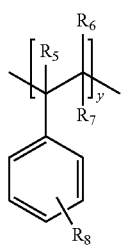

[Chemical Formula 12]

in the above formula 12, $R_5$ to $R_8$ are each independently hydrogen or $C_{1-10}$alkyl, and y is an integer of 1 to 20. The $R_8$ functional group may be bonded to at least one of the remaining 2nd to 6th carbon atoms excluding the 1st carbon atom to which the vinyl-based functional group is bonded in the benzene ring. For example, the $R_8$ functional group may be bonded to the 4th carbon atom.

The alkyl may be substituted or unsubstituted, and the 'substituted' means that a hydrogen atom contained in an alkyl group is replaced with a specific functional group. Examples of the substituted functional groups are not particularly limited, and various functional groups or atomic groups widely known in the art, such as halogen, hydroxy group, amino group and the like can be used without limitation.

The (meth)acrylic-based repeating unit means a repeating unit derived from a (meth)acrylic monomer, and specifically refers to a repeating unit constituting a polymer formed through polymerization between (meth)acrylic monomers. The (meth)acrylic monomer refers to a compound containing a (meth)acryl functional group. The specific examples thereof are not particularly limited, but include, for example, a (meth)acrylate compound or a (meth)acrylic acid compound.

More specifically, the (meth)acrylic repeating unit may include a repeating unit represented by the following chemical formula 13:

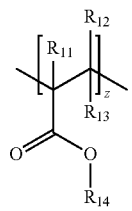

[Chemical Formula 13]

in the above formula 13, $R_{11}$ to $R_{14}$ are each independently hydrogen or $C_{1-10}$alkyl and z is an integer of 1 to 20.

The alkyl may be substituted or unsubstituted, and the term "substituted" means that a hydrogen atom contained in an alkyl group is substituted with a specific functional group. Examples of the substituted functional groups are not particularly limited, and various functional groups or atomic groups widely known in the art, such as halogen, hydroxy group, amino group and the like can be used without limitation.

Transmittance Improving Agent Having an Epoxy Functional Group

On the other hand, the polycarbonate resin composition may further include a transmittance improving agent having an epoxy functional group together with the polycarbonate and the polyethylene oxide-polypropylene oxide block copolymer so as to exhibit not only excellent color tone stability but also an improved light transmittance.

Specifically, in the case of the polycarbonate resin composition including the transmittance improving agent having an epoxy functional group, the transmittance of long-wavelength light measured for a test specimen having a thickness of 4 mm may be 80% or more. At this time, the transmittance of long-wavelength light can be measured using a spectrophotometer such as Hitachi U-4100.

As the transmittance improving agent having an epoxy functional group, a compound in which one or more epoxy groups are introduced into the molecule can be used. Specifically, the transmittance improving agent having an epoxy functional group may include a vinyl-based polymer including a (meth)acrylate repeating unit containing an epoxy functional group as described above. More specifically, the transmittance improving agent having an epoxy functional group may be a vinyl-based polymer including a (meth)acrylate repeating unit containing the epoxy functional group as described above.

The transmittance improving agent having an epoxy functional group may be contained in an amount of 0.01 to 5 parts by weight based on 100 parts by weight of the polycarbonate. For example, the transmittance improving agent having an epoxy functional group may be contained in an amount of 0.01 to 2.5 parts by weight, particularly 0.01 to 1 part by weight, based on 100 parts by weight of the polycarbonate.

Polyoxytetramethylene Glycol

On the other hand, when the polycarbonate resin composition is used as a light guide plate, the resin composition may further include polyoxytetramethylene glycol in order to further improve the color tone stability and the light transmittance.

The term "polyoxytetramethylene glycol" as used herein is a polymer represented by the following chemical formula 6 and can be prepared ring-opening polymerization of tetrahydrofuran:

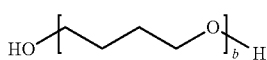

[Chemical Formula 6]

in the above formula 6, b is an integer of 1 or more, specifically 7 to 140.

The polyoxytetramethylene glycol preferably has a weight average molecular weight of 500 to 10,000 g/mol. Within the above range, the physical properties of the light guide plate can be effectively improved.

In addition, the polyoxytetramethylene glycol may be contained in an amount of 0.02 to 1 part by weight based on 100 parts by weight of the polycarbonate. For example, the polyoxytetramethylene glycol may be contained in an amount of 0.05 to 1 part by weight, particularly 0.05 to 0.7 part by weight, more particularly 0.05 to 0.5 part by weight based on 100 parts by weight of the polycarbonate. Within this range, the light transmittance can be further improved without deteriorating the properties of the polycarbonate in the resin composition Polycarbonate Resin Composition The polycarbonate resin composition according to the present invention comprises 100 parts by weight of a polycarbonate; 0.02 to 1 part by weight of a block copolymer containing a polyethylene oxide (PEO) block represented by the formula 1 and a polypropylene oxide (PPO) block represented by the formula 2; and 0.01 to 5 parts by weight of a vinyl-based polymer including a (meth)acrylate repeating unit containing an epoxy functional group.

Alternatively, the polycarbonate resin composition according to the present invention comprises: 100 parts by weight of a polycarbonate; 0.02 to 1 part by weight of a block copolymer containing a polyethylene oxide (PEO) block represented by the formula 1 and a polypropylene oxide (PPO) block represented by the formula 2; and 0.01 to 5 parts by weight of a transmittance improving agent having an epoxy functional group, wherein a transmittance of long-wavelength light measured for a test specimen having a thickness of 4 mm is 80% or more.

In addition, if necessary, the resin composition may further include one or more additives selected from the group consisting of an antioxidant, a heat stabilizer, a plasticizer, an antistatic agent, a nucleating agent, a flame retardant a lubricant, an impact modifier, a fluorescent whitening agent, an ultraviolet absorber, a hydrolysis-resistant agent and a chain-linking agent, which are commonly used in the art The resin composition can be produced by mixing a polycarbonate, a polyethylene oxide-polypropylene oxide block copolymer, an epoxy group-containing vinyl-based polymer and, optionally, additives, and it is desirable to melt-knead and produce into pellets in order to produce an optical molded article as will be described below.

The melt kneading may be carried out by a method commonly used in the art, for example, a method using a ribbon blender, a Henschel mixer, a Banbury mixer, a drum tumbler, a single screw extruder, a twin screw extruder, a co-kneader, a multi-screw extuder and the like. The temperature of the melt-kneading can be suitably adjusted as needed, and preferably it may be adjusted to a temperature of 200 to 300° C.

Optical Molded Article

The present invention also provides an optical molded article comprising the resin composition. Preferably, the optical molded article is a light guide plate.

The term "light guide plate" as used herein means a component that performs the luminance and uniform lighting function of the backlight unit of the liquid crystal display device. Since light is transmitted through the light guide plate, transparency, that is, light transmittance should be excellent. In addition, since a molding temperature of the light guide plate and a high temperature during operation are required, a high heat resistance is required Therefore, the resin composition according to the present invention is excellent in light transmittance and heat resistance required for the light guide plate, and thus can be usefully used as a light guide plate. Specifically, the resin composition exhibits a transmittance of long-wavelength light of 80% or more and a yellow index of long-wavelength light of 11 or less when measured for a test specimen having a thickness of 4 mm, and thus is suitable for use as a material for a light guide plate.

The light guide plate can be produced by a method commonly used in the art. For example, the light guide plate can be produced by applying a molding method such as injection molding, injection compression molding, extrusion molding, vacuum molding, blow molding, press molding, air-pressure molding, foam molding, thermal bending molding, compression molding, calendar molding, rotary molding, or the like, using the melt-kneaded product or pellet of the resin composition according to the present invention as a raw material.

The thickness of the light guide plate can be appropriately adjusted according to the purpose of use, and the shape of the light guide plate can also have a flat plate shape or a curved shape depending on the purpose of use.

Advantageous Effects

The polycarbonate resin composition according to the present invention is excellent in transmittance and color tone uniformity required in a light guide plate and also is excellent in processability and thus can be usefully used as a material for a light guide plate.

Detailed Description of the Embodiments

Below, preferred embodiments will be provided in order to assist in the understanding of the present disclosure. However, these examples are provided only for illustration of the present invention, and should not be construed as limiting the present invention to these examples.

Materials Used

The following materials were used in Examples and Comparative Examples below.

Polycarbonate Resin (PC)

A bisphenol A type linear polycarbonate having a weight average molecular weight of 16,000 g/mol and MFR (300° C., 1.2 kg) of 120 g/min was used.

PEO-PPO-PEO Block Copolymer (PEO-PPO-PEO)

A PEO-PPO-PEO block copolymer from Aldrich, having a weight average molecular weight of 2,000 g/mol was used PPO-PEO-PPO Block Copolymer (PPO-PEO-PPO)

PPO-PEO-PPO block copolymer from Aldrich, having a weight average molecular weight of 2,000 g/mol was used Polyoxypropylene Glycol (PPG)

Uniol D-2000 from NOF Corporation, having a weight average molecular weight of 2,000 g/mol was used.

Polyoxyethylene Glycol (PEG)

PEG from Aldrich, having a weight average molecular weight of 2,000 g/mol was used Polyoxytetramethylene Glycol (PTMG)

PTMG 2000 from KPX Chemical Co., Ltd., having a weight average molecular weight of 2.000 g/mol was used.

Epoxy Group-Containing Vinyl-Based Polymer

Joncryl ADR-4370F (epoxy equivalent weight; 285 g/mol) from BASF, having a weight average molecular weight of 6.800 g/mol was used.

Epoxy Group-Containing Compound

As the polyfunctional epoxy compound which is not a vinyl-based polymer, C2021P from Daicel Corporation represented by the following chemical formula 7 was used

[Chemical Formula 7]

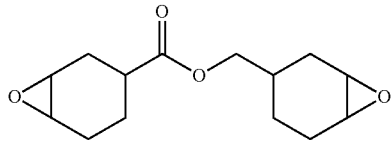

Antioxidant

DP9228 from Dover Chemical Corporation was used.

Examples and Comparative Examples

After mixing the respective components with the content as shown in Table 1 below, pellet samples were prepared at a rate of 80 kg per hour in a twin screw extruder (L/D=36. Φ=45, barrel temperature: 240° C.).

The physical properties of the pellets were measured by the following methods.

* Transmittance of long-wavelength light (T %) and yellow index of long-wavelength light (YI): Each of the test specimens (length/width/thickness=150 mm/80 mm/4 mm) was injection-molded and irradiated in a direction perpendicular to the thickness with Hitachi Spectrophotometer U-4100, and the transmittance (transmittance of long-wavelength light) and color tone stability (yellow index of long-wavelength light) were measured.

The results are shown in Table 2 below.

TABLE 2

| | Transmittance of long-wavelength light (T %) | Yellow index of long-wavelength light (YI) |
|---|---|---|
| Example 1 | 80.27 | 10.6 |
| Example 2 | 81.23 | 10.2 |
| Example 3 | 80.70 | 10.11 |
| Example 4 | 82.30 | 9.98 |
| Comparative Example 1 | 78.42 | 11.32 |
| Comparative Example 2 | 77.82 | 12.39 |
| Comparative Example 3 | 76.24 | 12.13 |
| Comparative Example 4 | 77.69 | 13.01 |
| Comparative Example 5 | 77.51 | 12.05 |
| Comparative Example 6 | 76.42 | 11.87 |
| Comparative Example 7 | 78.22 | 12.01 |
| Comparative Example 8 | 71.91 | 29.3 |

As shown in Table 2, it could be confirmed that Examples according to the present invention was excellent in both the yellow index of long-wavelength light and transmittance of long-wavelength light as compared with Comparative Examples. Specifically, the polycarbonate resin compositions of Examples exhibited a yellow index of long-wavelength light of 11 or less and a transmittance of long-wavelength light of 80% or more with respect to a test specimen having a thickness of 4 mm. In particular, it could be confirmed that all of the respective characteristics were improved as compared with Comparative Examples 1 and 3 using each of polyoxypropylene glycol (PPG) and polyoxyethylene glycol (PEG), respectively.

It could also be confirmed that Examples 3 and 4 using PEO-PPO-PEO block copolymer or PPO-PEO-PPO block

TABLE 1

| | Unit (g) | | | | | | | | |
|---|---|---|---|---|---|---|---|---|---|
| | PC | PEO-PPO-PEO | PPO-PEO-PPO | PPG | PEG | PTMG | ADR-4370F | C2021P | DP9228 |
| Example 1 | 100 | 0.15 | | | | | 0.075 | | 0.075 |
| Example 2 | 100 | 0.075 | | | | 0.075 | 0.075 | | 0.075 |
| Example 3 | 100 | | 0.15 | | | | 0.075 | | 0.075 |
| Example 4 | 100 | | 0.075 | | | 0.075 | 0.075 | | 0.075 |
| Comparative Example 1 | 100 | | | 0.15 | | | 0.075 | | 0.075 |
| Comparative Example 2 | 100 | | | 0.075 | | 0.075 | 0.075 | | 0.075 |
| Comparative Example 3 | 100 | | | | 0.15 | | 0.075 | | 0.075 |
| Comparative Example 4 | 100 | | | | 0.075 | 0.075 | 0.075 | | 0.075 |
| Comparative Example 5 | 100 | 0.15 | | | | | | | 0.075 |
| Comparative Example 6 | 100 | | 0.15 | | | | | | 0.075 |
| Comparative Example 7 | 100 | | 0.15 | | | | | 0.075 | 0.075 |
| Comparative Example 8 | 100 | | | | | | | | | copolymer and polyoxytetramethylene glycol (PTMG) at the same time were more effective in improving the long light yellow index and long light transmittance. In contrast to this, in the case of Comparative Examples 2 and 4 in which each of polyoxypropylene glycol (PPG) and polyoxyethylene glycol (PEG) was used together with PTMG, the color tone stability was decreased as compared vwith Comparative Examples 1 and 3 using only PPG and PEG.

In addition, Comparative Example 7 using the PPO-PEO-PPO block copolymer and the alicyclic epoxy compound C2021P at the same time exhibited reduced transmittance and color tone stability compared with Example 3. Thereby, it could be seen that when the vinyl-based polymer including a repeating unit of (meth)acrylate containing an epoxy functional group among the polyfunctional epoxy compounds is excellent in the effect of improving the properties of the light guide plate when added together with the PPO-PEO-PPO block copolymer.

Therefore, it could be confirmed that the resin composition according to the present invention can improve all characteristics required as the light guide layer by using the polyethylene oxide-polypropylene oxide block copolymer and the epoxy group-containing vinyl polymer together.

What is claimed is:

1. A polycarbonate resin composition comprising:
   100 parts by weight of a polycarbonate;
   0.02 to 1 part by weight of a block copolymer containing a polyethylene oxide (PEO) block represented by the following chemical formula 1 and a polypropylene oxide (PPO) block represented by the following chemical formula 2; and
   0.01 to 5 parts by weight of a vinyl-based polymer including a (meth)acrylate repeating unit containing an epoxy functional group,
   wherein the vinyl-based polymer including a (meth)acrylate repeating unit containing an epoxy functional group has a weight average molecular weight of 1,000 to 10,000 g/mol:

[Chemical Formula 1]

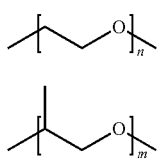

[Chemical Formula 2]

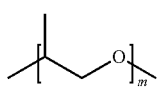

in the above formulas 1 and 2,
n and m are each independently an integer of 1 or more, and
n+m is 7 to 70.

2. The polycarbonate resin composition of claim 1, wherein the polycarbonate has a weight average molecular weight of 14,000 to 50,000 g/mol.

3. The polycarbonate resin composition of claim 1, wherein the polycarbonate includes a repeating unit represented by the following chemical formula 3:

[Chemical Formula 3]

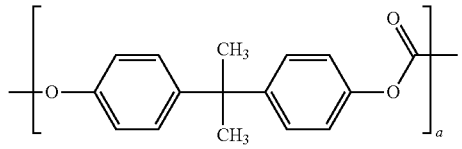

in the above formula 3,
a is an integer of 1 or more.

4. The polycarbonate resin composition of claim 1, wherein the block copolymer is a block copolymer in the form of PEO-PPO-PEO or PPO-PEO-PPO.

5. The polycarbonate resin composition of claim 1, wherein the block copolymer has a weight average molecular weight of 500 to 10,000 g/mol.

6. The polycarbonate resin composition of claim 1, wherein the block copolymer is contained in an amount of 0.05 to 0.5 part by weight, and the vinyl-based polymer is contained in an amount of 0.01 to 0.1 parts by weight.

7. The polycarbonate resin composition of claim 1, wherein the epoxy functional group is bonded to the end of the branched chain of the (meth)acrylate repeating unit.

8. The polycarbonate resin composition of claim 1, wherein the (meth)acrylate repeating unit containing an epoxy functional group includes a repeating unit represented by the following chemical formula 11:

[Chemical Formula 11]

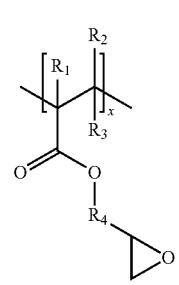

in the above formula 11,
$R_1$ to $R_3$ are each independently hydrogen or $C_{1-10}$ alkyl, $R_4$ is $C_{1-10}$ alkylene, and x is an integer of 1 to 20.

9. The polycarbonate resin composition of claim 1, wherein the vinyl-based polymer further includes an aromatic vinyl-based repeating unit or a (meth)acrylic-based repeating unit.

10. The polycarbonate resin composition of claim 9, wherein the aromatic vinyl-based repeating unit includes a repeating unit represented by the following chemical formula 12:

[Chemical Formula 12]

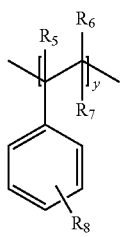

in the above formula 12,
$R_5$ to $R_8$ are each independently hydrogen or $C_{1-10}$ alkyl, and y is an integer of 1 to 20.

11. The polycarbonate resin composition of claim 9, wherein the (meth)acrylic-based repeating unit includes a repeating unit represented by the following chemical formula 13:

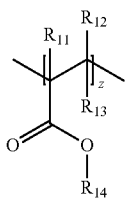

[Chemical Formula 13]

in the above formula 13,
$R_{11}$ to $R_{14}$ are each independently hydrogen or $C_{1-10}$ alkyl, and z is an integer of 1 to 20.

12. The polycarbonate resin composition of claim 1, wherein the vinyl-based polymer including a (meth)acrylate repeating unit containing an epoxy functional group has an epoxy equivalent weight of 100 to 500 g/mol.

13. The polycarbonate resin composition of claim 1, further including 0.02 to 1 part by weight of polyoxytetramethylene glycol.

14. The polycarbonate resin composition of claim 1, wherein the resin composition further includes one or more additives selected from the group consisting of an antioxidant, a heat stabilizer, a plasticizer, an antistatic agent, a nucleating agent, a flame retardant, a lubricant, an impact modifier, a fluorescent whitening agent, an ultraviolet absorber, a hydrolysis-resistant agent and a chain-linking agent.

15. An optical molded article comprising the polycarbonate resin composition of claim 1.

16. The optical molded article of claim 15, wherein the optical molded article is a light guide plate.

\* \* \* \* \*